United States Patent
Schiffman et al.

(10) Patent No.: US 11,689,357 B2
(45) Date of Patent: Jun. 27, 2023

(54) KEY ENCRYPTION KEY WRAPPING

(71) Applicant: HEWLETT-PACKARD DEVELOPMENT COMPANY, L.P., Spring, TX (US)

(72) Inventors: Joshua Serratelli Schiffman, Bristol (GB); Thalia Laing, Bristol (GB); Shivaun Albright, Rocklin, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 30 days.

(21) Appl. No.: 16/606,462

(22) PCT Filed: Jun. 1, 2018

(86) PCT No.: PCT/US2018/035595
§ 371 (c)(1),
(2) Date: Oct. 18, 2019

(87) PCT Pub. No.: WO2019/231465
PCT Pub. Date: Dec. 5, 2019

(65) Prior Publication Data
US 2021/0377007 A1    Dec. 2, 2021

(51) Int. Cl.
*H04L 9/08* (2006.01)
*G06F 3/12* (2006.01)
(Continued)

(52) U.S. Cl.
CPC .......... *H04L 9/0822* (2013.01); *G06F 3/1222* (2013.01); *G06F 3/1238* (2013.01);
(Continued)

(58) Field of Classification Search
CPC ... H04L 9/0822; H04L 9/0863; G06F 3/1222; G06F 3/1238; G06F 21/31; G06F 21/608
See application file for complete search history.

(56) References Cited

U.S. PATENT DOCUMENTS 7,450,260 B2   11/2008   Takeda et al.
7,929,167 B2   4/2011   Kato
(Continued)

FOREIGN PATENT DOCUMENTS

JP   2005190356 A   7/2005

OTHER PUBLICATIONS

Yasushi et al. A Secure Printing System for Ubiquitous Network, IEEE, pp. 1-5 (Year: 2005).*

*Primary Examiner* — Farid Homayounmehr
*Assistant Examiner* — Mudasiru K Olaegbe
(74) *Attorney, Agent, or Firm* — Knobbe, Martens, Olson & Bear, LLP

(57) ABSTRACT

In an example, a method of encryption is described to include generation of a content encryption key and a key encryption key. In that example, the content encryption key is wrapped based on a key wrap operation using the key encryption key and the wrapped content encryption key is encrypted using a policy encryption key. Further in that example, the policy encryption key is encrypted using a public key corresponding to a print apparatus. In an example, a method of decryption is described. The example method of decryption performs recovery of a policy object using a private key corresponding to a print apparatus. In that example, the policy object includes a wrapped key that is unwrapped using a key encryption key to recover a content encryption key usable to decrypt an encrypted electronic document.

15 Claims, 10 Drawing Sheets

(51) Int. Cl.
    *G06F 21/31*     (2013.01)
    *G06F 21/60*     (2013.01)

(52) U.S. Cl.
    CPC ............ *G06F 21/31* (2013.01); *G06F 21/608* (2013.01); *H04L 9/0863* (2013.01)

(56) References Cited

U.S. PATENT DOCUMENTS

| | | | |
|---|---|---|---|
| 9,075,550 B2 | 7/2015 | Kakutani | |
| 9,735,962 B1* | 8/2017 | Yang | H04L 9/0877 |
| 2003/0105963 A1* | 6/2003 | Slick | G06F 21/608 |
| | | | 380/282 |
| 2003/0137690 A1* | 7/2003 | Hoover | G06F 3/1287 |
| | | | 358/1.15 |
| 2003/0182475 A1* | 9/2003 | Gimenez | G06F 21/10 |
| | | | 710/8 |
| 2004/0003270 A1* | 1/2004 | Bourne | G06F 21/10 |
| | | | 713/193 |
| 2004/0146164 A1* | 7/2004 | Jonas | H04L 9/0822 |
| | | | 380/284 |
| 2005/0257271 A1* | 11/2005 | Lafornara | H04L 9/3263 |
| | | | 726/26 |
| 2006/0050879 A1* | 3/2006 | Iizuka | G06F 21/608 |
| | | | 380/51 |
| 2007/0220610 A1* | 9/2007 | Van Loenen | H04N 7/1675 |
| | | | 348/E7.056 |
| 2009/0259591 A1* | 10/2009 | Starostin | H04L 63/10 |
| | | | 705/59 |
| 2010/0235649 A1* | 9/2010 | Jeffries | G06F 21/6209 |
| | | | 726/28 |
| 2012/0254616 A1 | 10/2012 | Brown | |
| 2013/0097421 A1* | 4/2013 | Lim | H04L 63/0471 |
| | | | 713/167 |
| 2016/0127327 A1 | 5/2016 | Mehta et al. | |
| 2016/0205074 A1* | 7/2016 | Mitchell | H04L 63/0823 |
| | | | 713/171 |
| 2016/0323264 A1* | 11/2016 | Nayshtut | H04L 63/061 |
| 2018/0048464 A1* | 2/2018 | Lim | H04L 9/0894 |
| 2021/0090037 A1* | 3/2021 | Dowding | G06Q 20/06 |

* cited by examiner

KEY ENCRYPTION KEY WRAPPING

BACKGROUND

Images are processable for use with computing machines, such as a print apparatus. A print apparatus, for example, may produce a physical representation of an image by operating a print fluid ejection system according to the control data based on processed image data. An image may be processed in a print apparatus pipeline or processed offline on a separate compute device, such as a print server. Image data to be replicated may be transferred to a print apparatus over a direct cable connection with a user device (such as a desktop computer), a wireless connection (such as via mobile device), over a network connection (such as via a local area network or the Internet), or a data transfer path including a combination thereof. Electronic documents including image data may be transferred in a public manner or in a private manner using a form of obfuscation, such as encryption.

DETAILED DESCRIPTION

In the following description and figures, some example implementations of methods of encryption, methods of decryption, and devices capable of using such methods of encryption and/or decryption are described. Some print solutions are vulnerable to attacks, such as man-in-the-middle attacks, where an adversary can spoof the identity of a print apparatus and read a confidential document, Transport security mechanisms may provide authenticated, end-to-end encryption of print jobs, whereas some print workflows, such as pull printing or cloud based printing, do not allow the user to connect directly to a print apparatus. As a result, the user may not know where the job is sent or how the job is handled by intermediary services. In some examples, print jobs may be encrypted using a password-derived symmetric encryption key, but such jobs may be vulnerable to undetected manipulation of the encrypted print job and/or interception of the print job followed by decryption (e.g., when the password is weak or discovered by an adversary).

Various examples described below relate to encrypting a document using a first form of encryption to protect the content under a release policy and a second form of encryption using a printer-based information. For example, an electronic document for printing may be protected with a user password (or other user-specific information) and restricted to being printed by a specific print apparatus, such as by limitations using public-key cryptography with the print apparatus or via another device performing cryptographic operations. By binding the electronic document in a dually protective manner, a print job is released when multiple conditions are met, and attacks isolated to a user or a printer may be prevented, for example.

Figure 1:
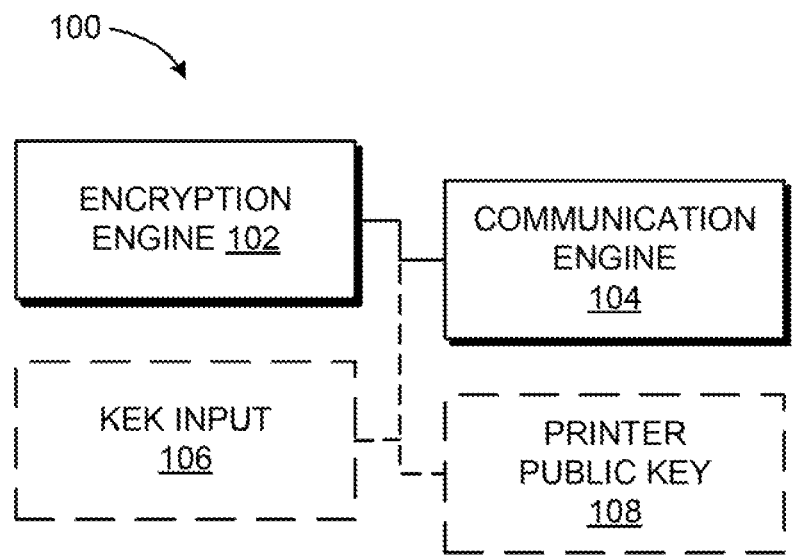
FIG. 1 is a block diagram depicting an example encryption system.

FIG. 1 is a block diagram depicting an example encryption system 100. The example encryption system 100 of FIG. 1 generally includes an encryption engine 102 and a communication engine 104. In general, the encryption engine 102 uses multiple encryption techniques to protect data including, a wrapping technique using input 106 for generating a key encryption key (KEK) and an encryption technique using a printer public key 108, and the communication engine 104 may prepare transmission of a file encrypted by the encryption engine 102.

The encryption engine 102 represents any circuitry or combination of circuitry and executable instructions to wrap a key using a key wrapping technique that utilizes a KEK and to encrypt a key using a printer public key 108. The encryption engine 102 uses unique print job data (i.e., the KEK input 106) and unique printer data to protect the print job. The encryption engine 102 may generate an electronic package of data encrypted using the unique print job data and the unique printer data such that the print job is protected by multiple security vectors. The KEK input 106 and the printer public key 108 may be locally stored with the encryption system 100 or may be retrievable from a remote storage.

In an example, the encryption engine 102 may be a combination of circuitry and executable instructions to generate a KEK using a passphrase provided by a user and use a key wrapping technique to wrap data, such as a content key, using the generated KEK. As used herein, the KEK is a combination of characters derived from user-associated data or policy-associated data. The user-associated data or policy-associated data is represented in FIG. 1 as KEK input 106. As used herein, user-associated data may be any appropriate data provided by a user or correspond to a user profile, Example user-associated data includes a user-provided passphrase (e.g., a password) or biometric data, a centrally-stored personal identification number (PIN), unique data stored with the user profile (such as an Active Directory file), and the like. As used herein, the policy-associated data may be any appropriate data corresponding to a release policy for printing a print job. Example policy-associated data includes location-based information (such as a geographic region, an Internet Protocol (IP) address, a Media Access Control (MAC) address list, or building category), time-based information (such as range of hours to perform the print job), group-based information (such as restrictions to a security level, a role, a specific team or department, the executive committee or board members, etc.), process-based information (such as a maximum number of copies, whether color reproduction is allowed, page size restrictions, workflow limitations, or any other data corresponding to how the document is to be processed) and the like.

The encryption engine 102 may include circuitry or a combination of circuitry and executable instructions to generate a plurality of keys. For example, the encryption engine 102 may include a combination of circuitry and executable instructions, to generate a content encryption key (CEK) to use for content of an electronic document, encrypt content using the CEK, generate a KEK from user-associated data or policy-associated data, wrap the CEK based on a key wrap operation using the KEK, generate a policy encryption key (PEK), encrypt the wrapped CEK using the PEK, and encrypt the PEK using a public key corresponding to a print apparatus. Keys, such as the CEK and PEK, are a combination of characters (such as letters, numbers, and/or symbols) useable as a parameter that determines the functional output of a cryptographic algorithm. As used herein, a wrapping operation represents an encryption operation with authentication. In this manner, a wrapping operation may encrypt a content encryption key using the key encryption key in a manner that allows for the wrapped key generated from the wrapping operation to be authenticated.

The encryption engine 102 may include circuitry or a combination of circuitry and executable instructions to generate a policy object. A policy object, as used herein, is a data structure with storage variables that represent values corresponding to policy parameters (e.g., settings and/or rules). For example, the policy object may include a release policy for specific data (e.g., a particular document or print job) that includes a number of permissions and a number of rules and/or conditions for printing the specific data. For example, the policy object may include a wrapped key, print job information including a subject or title of a print job, parameters and printing limitations as set by a rule, other restrictions, a nonce (discussed further below), and the like. The policy object may be a package of separate data, such as separately encrypted data.

The policy object may be encrypted in way preferable for the size of the policy object. For example, the header of the policy object may be encrypted asymmetrically while the payload of the policy object is encrypted symmetrically. As another example, hybrid encryption may be used to encrypt the policy object. The encryption engine 102 may encrypt the policy object using a PEK that is different from the CEK, KEK, and the public key of the destination print apparatus. In that example, the encryption engine 102 may encrypt the PEK with the public key of the destination print apparatus and provide the encrypted PEK with the policy object encrypted with the PEK to reduce the size of the payload provided to the print apparatus.

The encryption engine 102 may generate a nonce and include the nonce in the policy object. A nonce, as used herein, represents a unique set of characters. The nonce may be used to ensure authentication of the print job. For example, the encryption engine 102 may generate a random nonce for a policy object that may be verified by the print apparatus, thus a repeated nonce may indicate an intercepted print job. In this manner, a randomly generated nonce may allow for improved authentication and avoid potential attacks to confidential data, for example.

The communication engine 104 represents any circuitry or combination of circuitry and executable instructions to prepare a file encrypted by the encryption engine 102 to a print apparatus corresponding to the printer public key 108. For example, the communication engine 104 may include a combination of circuitry and executable instructions to send a first cipher corresponding to the encrypted policy object and a second cipher corresponding to the encrypted policy encryption key to the print apparatus.

The encryption system 100 may be implemented as an intermediary between a user device and the destination print apparatus. In such an example, the communication engine 104 may be implemented as part of a print server to receive an electronic file encrypted with a public key of a print server and the encryption engine 102 decrypts the electronic file to recover the policy object using service-specific information (e.g., a printer server public key), the encryption engine 102 selects the print apparatus from a printer group identified by the print server based on a retrieval request (e.g., a pull request to a specific printer), the encryption engine 102 encrypts the policy object using the public key of the selected print apparatus, and the communication engine 104 sends the re-encrypted policy object to the selected print apparatus. Such an example is discussed further with respect to FIG. 4. In some examples, functionalities described herein in relation to any of FIGS. 1-6 may be provided in combination with functionalities described herein in relation to any of FIGS. 7-15.

Figure 2:
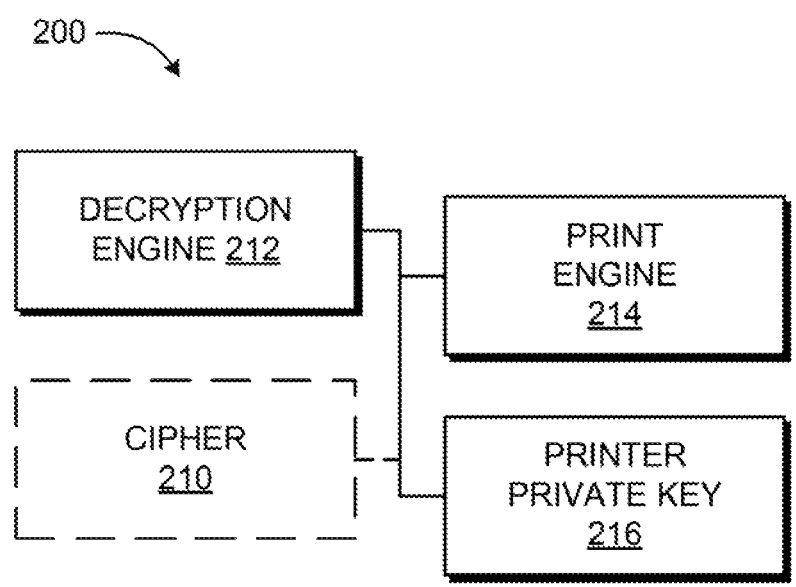
FIG. 2 is a block diagram depicting an example decryption system.

FIG. 2 is a block diagram depicting an example decryption system 200. The example decryption system 200 of FIG. 2 generally includes decryption engine 212 and a print engine 214. In general, the decryption engine 212 decrypts a cipher 210 via a technique using the printer private key 216 and the print engine 214 prepares an electronic file recovered via the decryption engine 212 to be printed by a print apparatus.

The decryption engine 212 represents any a circuitry or combination of circuitry and executable instructions to recover a wrapped key using a key corresponding to a print apparatus and unwrapping a key to recover a CEK usable to decrypt content. For example, the decryption engine 212 may include a combination of circuitry and executable instructions to recover a policy object using a private key corresponding to a print apparatus, generate a key encryption key using user-associated information or policy-associated information, unwrap a wrapped key of the policy object using the key encryption key to recover a content encryption key, and decrypting an encrypted electronic document using the content encryption key.

The decryption engine 212 may decrypt multiple keys in the process of decrypting an electronic document. For example, the decryption engine 212 may decrypt a package using a printer private key 216 to obtain the cipher 210. For another example, the cipher 210 may be a key cipher 210 that is decryptable using the printer private key 216. The cipher 210 and the printer private key 216 may be stored locally on the decryption system 200. In other examples, the cipher 210 may be retrieved remotely.

The decryption engine 212 may recover a policy object via a decryption technique and unwrap a key (i.e., decrypt a key with an authentication operation). For example, the decryption engine 212 may include a combination of circuitry and executable instruction to decrypt a key cipher using a private key corresponding to the print apparatus to recover a PEK, decrypt a policy cipher using the PEK to recover a policy object, unwrap a wrapped key located within the policy object using a KEK generated from user-provided information to recover a CEK, and decrypt an encrypted electronic document using the CEK.

The decryption engine 212 may perform further authentication operations. For example, the decryption engine 212 may include a combination of circuitry and executable instructions to retrieve a number of reference nonces from a storage medium coupled to the print apparatus, compare a nonce of a print job corresponding to the policy object to the number of references nonces retrieved from the storage medium. In that example, the decryption engine 212 may delete the print job in response to identification of a replayed nonce corresponding to the print job or may proceed with decrypting and/or performing a print operation.

The decryption engine 212 may cause components of a print apparatus to perform actions, such as operations corresponding to printing a document. For example, the decryption engine 212 may include a combination of circuitry and executable instructions to cause a display engine to display a prompt for a password corresponding to the KEK in response to a job selection of the list of available print jobs, cause a display engine to display a list of available print jobs for the print apparatus, and/or cause a display engine to display an error message in response to a request to print the print job outside of the rule or a parameter corresponding to the policy object.

The print engine 214 represents any circuitry or combination of circuitry and executable instructions to perform a print operation according to a release policy. For example, the print engine 214 may include a combination of circuitry and executable instructions to operate the print apparatus according to a rule of the policy object and print the decrypted electronic document when the rule of the policy is satisfied. In this manner, the print engine 214 may restrict performing a print operation until restrictions are met and the user and/or policy are verified as authorized.

Figure 3:
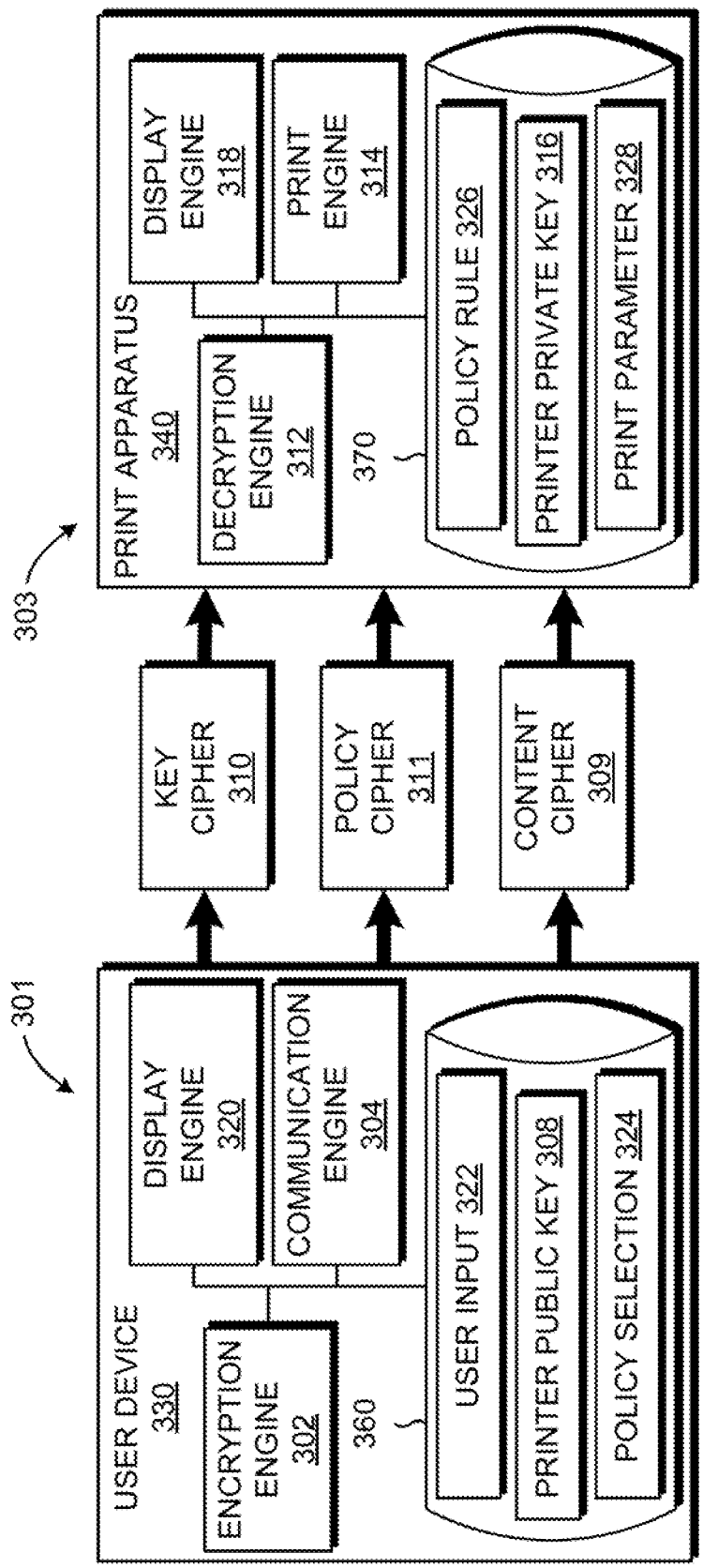
FIG. 3 is a block diagram depicting transfer of encrypted documents between an example encryption system and an example decryption system.

FIG. 3 is a block diagram depicting transfer of encrypted documents between an example encryption system 301 implemented on a user device 330 and an example decryption system 303 implemented on a print apparatus 340. In the example of FIG. 3, the user device 330 provides a content cipher 309, a key cipher 310, and a policy cipher 311 to a print apparatus 340 to be decrypted when appropriately authorized as defined by the policy object (e.g., based on the policy rule 326). As used herein, a content cipher is a cipher derived from encrypting content, a policy cipher is a cipher derived from encrypting the policy object, and a key cipher is a cipher derived from encrypting a key. In the example of FIG. 3, the key cipher 310 is a cipher derived from encrypting the PEK using the public key 308 of the print apparatus 340.

The encryption system 301 of the user device 330 generally includes an encryption engine 302, a communication engine 304, and a display engine 320. The decryption system 303 of the print apparatus 340 generally includes a decryption engine 312, a print engine 314, and a display engine 318. The encryption engine 302, the communication engine 304, the decryption engine 312, and the print engine 314 represent the same as the encryption engine 102 of FIG. 1, the communication engine 104 of FIG. 1, the decryption engine 212 of FIG. 2, and the print engine 214 of FIG. 2, respectively, and their descriptions are not repeated for brevity. The display engines 318 and 320 represent a combination of a display, circuitry, and executable instructions to present an image on the display. The display engines 318 and 320 may be user interfaces to allow for input to be provided by and/or presented to a user. For example, the display engine 320 may include a control panel that displays a user information request, such as a passphrase request to be used as input for generating a KEK. For another example, the display engine 320 may cause a display to present a list of available print jobs corresponding to a user. In yet another example, the display engine 320 may cause a display to present an error message in response to a request to print a job outside of the release policy (e.g., not in accordance with a rule or parameter defined by a policy object of the print job).

As shown in FIG. 3, the engines 302, 304, 312, 314, 318, and 320 may be integrated into a compute device, such as a user device or a print apparatus. The engines 302, 304, 312, 314, 318, and 320 may be integrated via circuitry or as installed instructions into a memory resource of the compute device. In other examples, the engines may be distributed across devices.

The user device 330 represents generally any compute device to communicate a network request and receive and/or process the corresponding responses. For example, a browser application may be installed on the user device 330 to receive the network packet from another device (e.g., a web server) and utilize the payload of the packet to display an element of a page via the browser application.

In examples described herein, a "print apparatus" may be a device to print content on a physical medium (e.g., paper, textiles, a layer of powder-based build material, etc.) with a print material (e.g., ink or toner). For example, the print apparatus may be a wide-format print apparatus that prints latex-based print fluid on a print medium, such as a print medium that is size A2 or larger. In some examples, the physical medium printed on may be a web roll or a pre-cut sheet. In the case of printing on a layer of powder-based build material, the print apparatus may utilize the deposition of print materials in a layer-wise additive manufacturing process. A print apparatus may utilize suitable print consumables, such as ink, toner, fluids or powders, or other raw materials for printing. In some examples, a print apparatus may be a three-dimensional (3D) print apparatus. An example of fluid print material is a water-based latex ink ejectable from a print head, such as a piezoelectric print head or a thermal inkjet print head. Other examples of print fluid may include dye-based color inks, pigment-based inks, solvents, gloss enhancers, fixer agents, and the like.

The compute devices 330 and 340 may include data stores (such as data stores 360 and 370) to contain information useable by the systems discussed herein. The compute devices 330 and 340 may include user interfaces (such as a display or a keyboard) to receive or provide information to a user. The compute devices 330 and 340 may include electronic interfaces (such as a network card or wireless transceiver) to provide information among devices. The compute devices may be electrically linked via the electronic interfaces. A link between devices represents one or a combination of a cable, wireless connection, fiber optic connection, or remote connections via a telecommunications link, an infrared link, a radio frequency link, or any other connectors of systems that provide electronic communication. The link may include, at least in part, intranet, the Internet, or a combination of both. The link may also include intermediate proxies, routers, switches, load balancers, and the like.

The data store 360 may include data useable with the encryption system 301 and the data store 370 may include data useable with the decryption system 303. For example, the data store 360 of FIG. 3 includes the printer public key 308, input 322 provided by a user, a selection 324 of a policy rule and/or parameter for a print job, etc. For another example, the data store 370 may include a printer private key 316, a policy rule 326, a print parameter 328, etc. In some examples, the data stores 360 and 370 may be the same data store or distributed among a number of data stores. A data store may be a memory resource as discussed herein.

Figure 4:
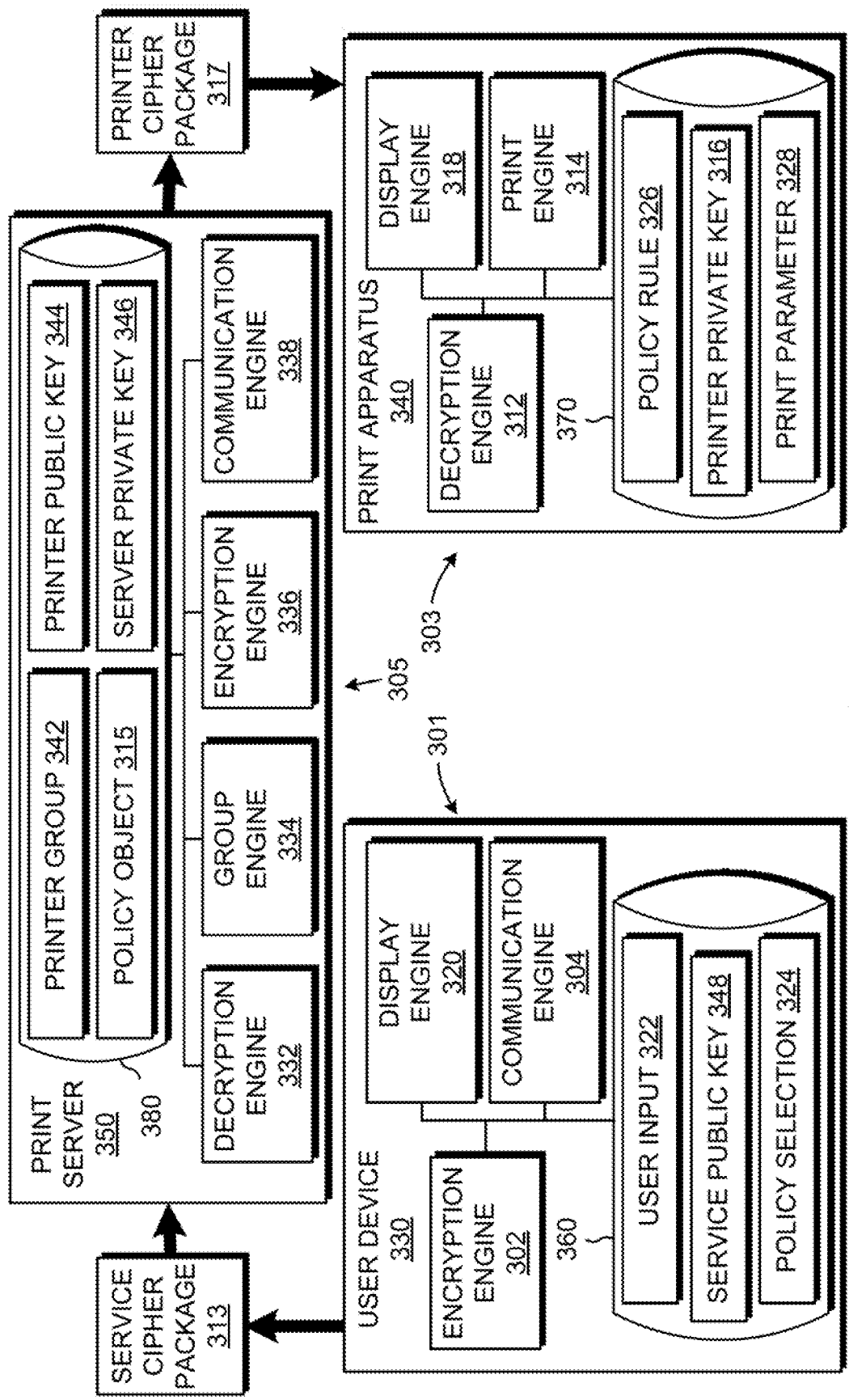
FIG. 4 is a block diagram depicting transfer of encrypted documents between an example encryption system and an example decryption system via an example print service.

FIG. 4 is a block diagram depicting transfer of encrypted documents between an example encryption system 301 implemented on a user device 330 and an example decryption system 303 implemented on a print apparatus 340 via secure transfer system 305 implemented on an example print service 350. In the example of FIG. 4, the encryption system 301 of the user device 330 generates a service cipher package 313 encrypted for authorization using a service public key 348 to restrict decryption to the print server 350.

The print server 350 includes an encryption and decryption system (e.g., the secure transfer system 305) that includes a decryption engine 332, a group engine 334, an encryption engine 336, a communication engine 338, and a data store 380. The decryption engine 332, the encryption engine 336, and the communication 338 are similar to the decryption engine 312, the encryption engine 302, and the communication engine 304, respectively. The decryption and encryption system of the print server 350 allows for securely routing the print job from the user device to the print apparatus through a service provided by the print server. The decryption engine 332 decrypts the service cipher package 313 using the server private key 346 to obtain the policy object 315. The group engine 334 represents circuitry or a combination of circuitry and executable instructions to, using information of the policy object 315, identifies a printer group 342 authorized to receive the print job corresponding to the policy object 315. The group engine 334 may include circuitry or a combination of circuitry and executable instructions to prepare a number of packages to be encrypted and passed to printers of the printer group via the communication engine 338. The encryption engine 336 performs the encryption of the policy object 315 using the printer private key for each print apparatus of the printer group to which the communication engine 338 is going to send. In this manner, the printer cipher package 317 is securely encrypted using the printer public key 344 such that the decryption system of the print apparatus 340 is able to decrypt the printer cipher package 317 using the printer private key 316.

The service device 350 represents generally any compute device(s) to respond to a network request received from a user device 330, whether virtual or real. For example, the service device 350 may operate a combination of circuitry and executable instructions to provide a network packet in response to a request for a page or functionality of an application.

The compute devices 330, 340, and 350 may be located on separate networks or part of the same network. An example computing environment may include any appropriate number of networks and any number of the networks may include a cloud compute environment. A cloud compute environment may include a virtual shared pool of compute resources, such as a distributed network comprising virtual computing resources. Any appropriate combination of the systems 301, 303, 305, and compute devices 330, 340, and 350 may be a virtual instance of a resource of a virtual shared pool of resources. The engines and/or modules of the system 300 herein may reside and/or execute "on, the cloud" (e.g., reside and/or execute on a virtual shared pool of resources).

Figure 5:
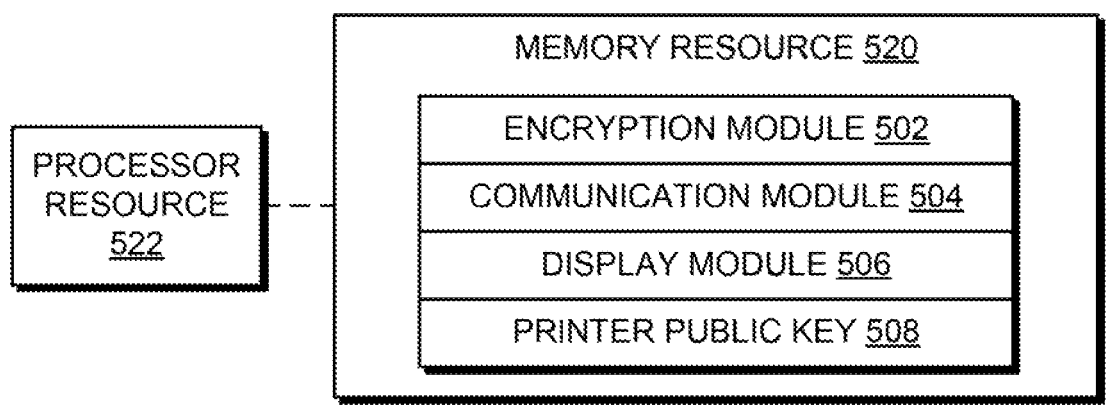
FIG. 5 is a block diagram depicting an example encryption system.
Figure 6:
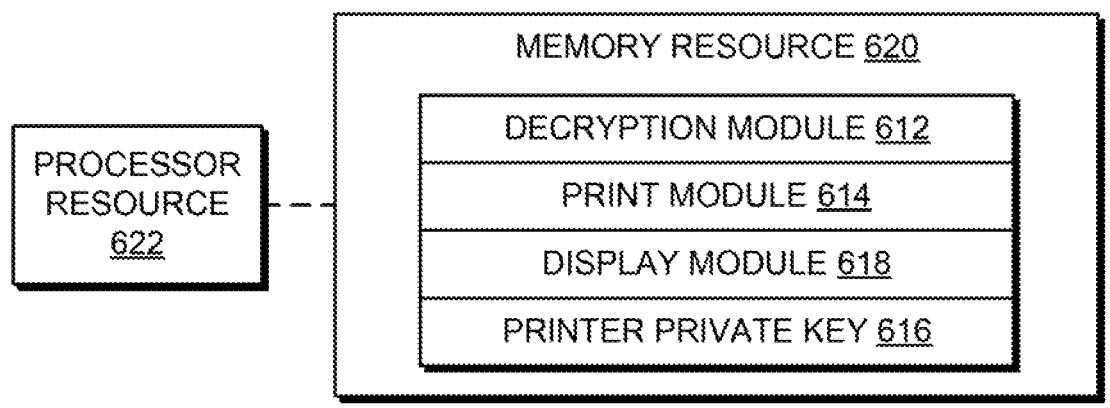
FIG. 6 is a block diagram depicting an example decryption system.

FIG. 5 is a block diagram depicting an example encryption system 500. FIG. 6 is a block diagram depicting an example decryption system 600. FIGS. 5 and 6 depict that the example systems 500 and 600 may comprise a memory resource 520 and 620 operatively coupled to a processor resource 522 and 622 respectively. The memory resources 520 and 620 may contain a set of instructions that are executable by the processor resource 522 and 622 respectively. The memory resources 520 and 620 may also contain data useable by the systems 500 and 600, such as the printer public key 508 and the printer private key 616.

The set of instructions of memory resource 520 are operable to cause the processor resource 522 to perform operations of the system 500 when the set of instructions are executed by the processor resource 522. The set of instructions stored on the memory resource 520 may be represented as an encryption module 502, a communication module 504, and a display module 506. The encryption module 502, the communication module 504, and the display module 506 represent program instructions that when executed cause function of the encryption engine 302, the communication engine 304, and the display engine 320 of FIG. 3, respectively. The processor resource 522 may carry out a set of instructions to execute the modules 502, 504, 506, and/or any other appropriate operations among and/or associated with the modules of the system 500. For example, the processor resource 522 may carry out a set of instructions to generate a KEK from user-associated data or policy-associated data, encrypt a CEK using the KEK to generate a wrapped key, generate a policy object that includes the wrapped key, encrypt the policy object with a PEK, and encrypt the PEK using a public key of a print apparatus. For another example, the processor resource 522 may carry out a set of instructions to encrypt content using the CEK, randomly generate a nonce, generate a wrapped key using a KEK based on user input, package the wrapped key, print job information, and the nonce into a policy object, encrypt the policy object using the PEK, encrypt the PEK using a public key of a print apparatus, and send a first cipher corresponding to the encrypted policy object and a second cipher corresponding to the encrypted PEK to the print apparatus. In yet another example, the processor resource 522 may carry out a set of instructions to receive an electronic file encrypted with a public key of a print server, unwrap the electronic file to recover the policy object, select a print apparatus from a printer group identified by the print server based on a retrieval request, and rewrap the policy object with a public key of a print apparatus.

The set of instructions of memory resource 620 are operable to cause the processor resource 622 to perform operations of the system 600 when the set of instructions are executed by the processor resource 622. The set of instructions stored on the memory resource 620 may be represented as a decryption module 612, a communication module 614, and a display module 618, The decryption module 612, the communication module 614, and the display module 618 represent program instructions that when executed cause function of the decryption engine 312, the communication engine 314, and the display engine 318 of FIG. 3, respectively. The processor resource 622 may carry out a set of instructions to execute the modules 612, 614, 618, and/or any other appropriate operations among and/or associated with the modules of the system 600. For example, the processor resource 622 may carry out a set of instructions to cause a control panel to display a user information request, decrypt a key cipher using a private key corresponding to a print apparatus to recover a PEK, decrypt a policy cipher using the PEK to recover a policy object with a wrapped key, unwrap the wrapped key using a KEK generated from user-provided information to recover a CEK, decrypt an encrypted electronic document using the CEK, operate a print apparatus according to a rule of the policy object, and print the decrypted electronic document when the rule of the policy object is satisfied. For another example, the processor resource 622 may carry out a set of instructions to cause the display engine to display a list of available print jobs for the print apparatus, retrieve a number of notices from a storage medium coupled to the print apparatus, compare a nonce of a print job corresponding to the policy object to the number of nonces retrieved from the storage medium, delete the print job in response to identification of a replayed nonce corresponding to the print job, cause the display engine to display a prompt for a password corresponding to the KEK in response to a job selection of the list of available print jobs, and cause the display engine to display an error message in response to a request to print the print job outside of the rule or a parameter corresponding to the policy object.

Although these particular modules and various other modules are illustrated and discussed in relation to FIGS. 5-6 and other example implementations, other combinations or sub-combinations of modules may be included within other implementations. Said differently, although the modules illustrated in FIGS. 5-6 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules.

A processor resource is any appropriate circuitry capable of processing (e.g., computing) instructions, such as one or multiple processing elements capable of retrieving instructions from a memory resource and executing those instructions. For example, the processor resource 522 may be a central processing unit (CPU) that enables encryption by fetching, decoding, and executing modules 502, 504, and 506. For another example, the processor resource 622 may be a CPU that enables decryption by fetching, decoding, and executing modules 612, 614, and 618. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

A memory resource represents a medium to store data utilized and/or produced by the systems discussed herein. The data stores discussed herein are memory resources as described below. The medium is any non-transitory medium or combination of non-transitory media able to electronically store data, such as modules and/or data of the systems 500 and 600. For example, the medium may be a storage medium, which is distinct from a transitory transmission medium, such as, a signal. The medium may be machine-readable, such as computer-readable. The medium may be an electronic, magnetic, optical, or other physical storage device that is capable of containing (i.e., storing) executable instructions. A memory resource may be said to store program instructions that when executed by a processor resource cause the processor resource to implement functionality of the system (e.g., system 500 and/or system 600). A memory resource may be integrated in the same device as a processor resource or it may be separate but accessible to that device and the processor resource. A memory resource may be distributed across devices.

In the discussion herein, the engines 102 and 104 of FIG. 1 the engines 212 and 214 of FIG. 2; the engines 302, 304, 312, 314, 318, 320, 332, 334, 336, and 338 of FIGS. 3 and 4; the modules 502, 504, and 506 of FIG. 5; and the modules 612, 614, 618 of FIG. 6 have been described as circuitry or a combination of circuitry and executable instructions Such components may be implemented in a number of fashions, Looking at FIG. 5, the executable instructions may be processor-executable instructions, such as program instructions, stored on the memory resource 520, which is a tangible, non-transitory computer-readable storage medium, and the circuitry may be electronic circuitry, such as processor resource 522, for executing those instructions. The instructions residing on a memory resource may comprise any set of instructions to be executed directly (such as machine code) or indirectly (such as a script) by a processor resource.

In some examples, the systems 500 and/or 600 may include the executable instructions may be part of an installation package that when installed may be executed by a processor resource to perform operations of the systems 500 and/or 600, such as methods described with regards to FIGS. 7-15. In that example, a memory resource may be a portable medium such as a compact disc, a digital video disc, a flash drive, or memory maintained by a computer device, such as a printer server 350 of FIG. 4, from which the installation package may be downloaded and installed. In another example, the executable instructions may be part of an application or applications already installed. A memory resource may be a non-volatile memory resource such as read-only memory (ROM), a volatile memory resource such as random-access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid-state drive (SSD), or an optical drive.

Referring to FIGS. 1-6, the engines and/or the modules may be distributed across devices, such as devices 330, 340, 350, of FIG. 4. The engine and/or modules may complete or assist completion of operations performed in describing another engine and/or module. Thus, although the various engines and modules are shown as separate engines in FIGS. 1-6, in other implementations, the functionality of multiple engines and/or modules may be implemented as a single engine and/or module or divided in a variety of engines and/or modules. In some example, the engines of the encryption system 100 may perform example methods described in connection with FIGS. 7-10 and the engines of decryption system 200 may perform the example methods described in connection with FIGS. 11-15.

Figure 7:
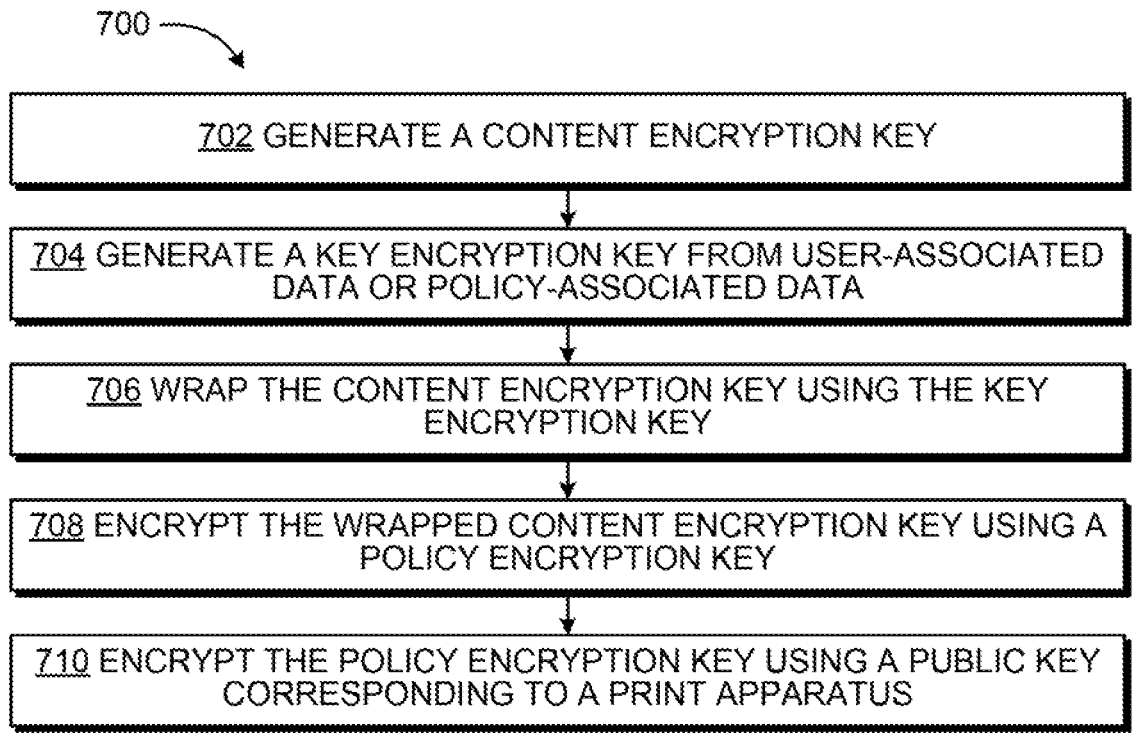
FIGS. 7-10 are flow diagrams depicting example methods of encryption.

FIGS. 7-10 are flow diagrams depicting example methods of encryption. The methods 700, 800, 900, and 1000 of FIGS. 7-10 are performable by engines, such as an encryption engine 102 of FIG. 1. Referring to FIG. 7, example method 700 of encryption may generally comprise generating a CEK to use for content of an electronic document, generating a KEK from user-associated data or policy-associated data, wrapping the CEK based on a key wrap operation using the KEK, encrypting the wrapped CEK using a PEK, and encrypting the PEK using a public key corresponding to a print apparatus.

At block 702, a CEK is generated. The CEK may be a randomly generated set of characters. At block 704, a KEK is generated. The KEK may be generated at least in part by a user-associated data or policy-associated data. The operations to produce the KEK may be repeatable based on the input data. In this manner, the KEK may be pseudorandom set of characters deterministically generated from a user-associated data or policy-associated data.

At block 706, the CEK is wrapped using the KEK. For example, a key wrapping operation may use the KEK derived from user-associated data or policy-associated data to authentically encrypt the CEK to result in a wrapped CEK. At block 708, the wrapped CEK is encrypted using a PEK. The PEK may be a randomly generated set of characters. At block 710, the PEK is encrypted using a public key corresponding to a print apparatus. In this manner, the symmetric cryptographic technique to encrypt the wrapped CEK with PEK may be kept secret in an asymmetric manner using a unique key corresponding to a print apparatus. In this manner, access to the key needed to retrieve the wrapped CEK is securely limited to the print apparatus, for example.

Figure 8:
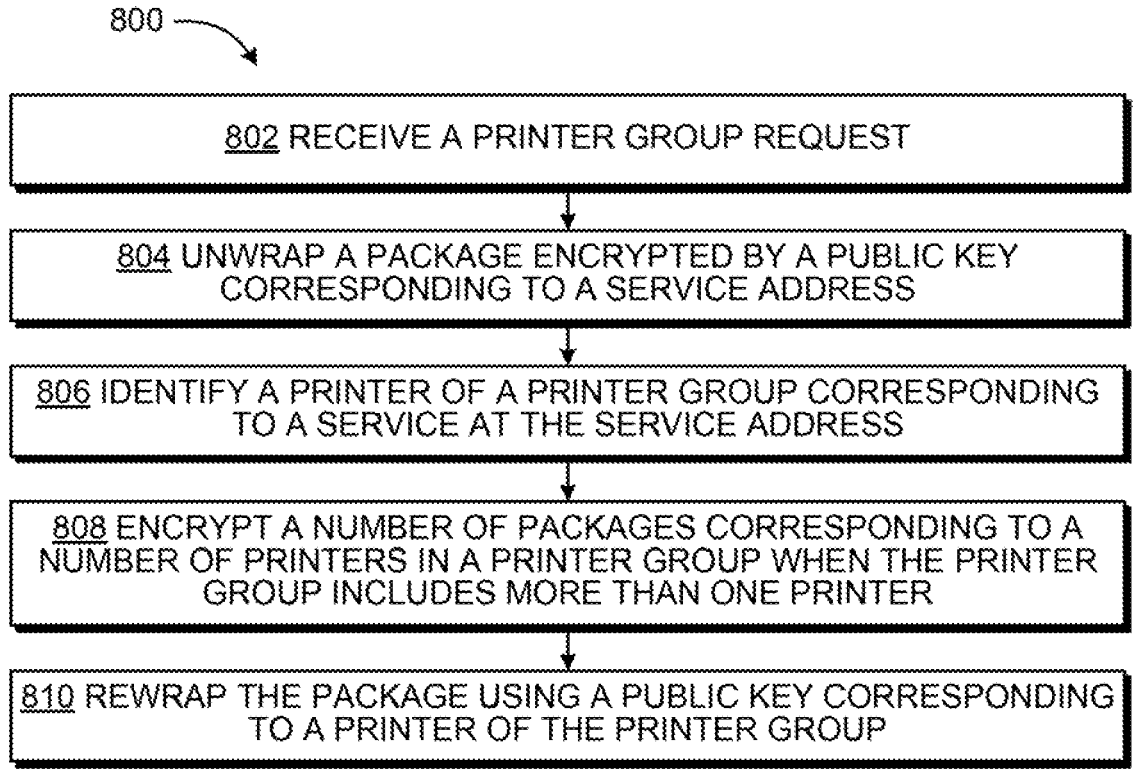

Referring to FIG. 8, example method 800 of encryption using a service intermediary may generally comprise unwrapping a package, identifying a printer of a printer group, and rewrapping the package to send to the identified printer. At block 802, a request to provide a print job to a printer group is received. For example, a print server may receive a printer group request with an encrypted package. At block 804, a package encrypted using a public key corresponding to a service address is unwrapped. The unwrapped package may provide a policy object including a wrapped key.

At block 806, a printer of a printer group corresponding to a service at the service address is identified. For example, a single printer may be identified, or a set of printers may be identified, to receive the packaged unwrapped at block 804. At block 808, a number of packages are encrypted. The number of encrypted packages at block 808 correspond to a number of printers in the print group identified at block 806 to receive the package. For example, an entire group of multiple printers may be selected to receive the package and a number equal to the size of the group of the printers may be encrypted. Thus, a single package may be encrypted when the group of printers is a single printer and a plurality of packages may be encrypted when the group of printers includes more than one printer (and more than one printer is selected to receive the package). At block 810, the package unwrapped at block 804 is rewrapped using a public key corresponding to a printer of the printer group. For example, each of the number of packages may be encrypted with a single public key and generating a uniquely decryptable package for each printer identified (e.g., selected) at block 806. Each package may include a PEK encrypted with a public key corresponding to a target printer of the printer group, a policy object encrypted using the PEK, and a content cipher encrypted using a CEK wrapped within the encrypted policy object.

Figure 9:
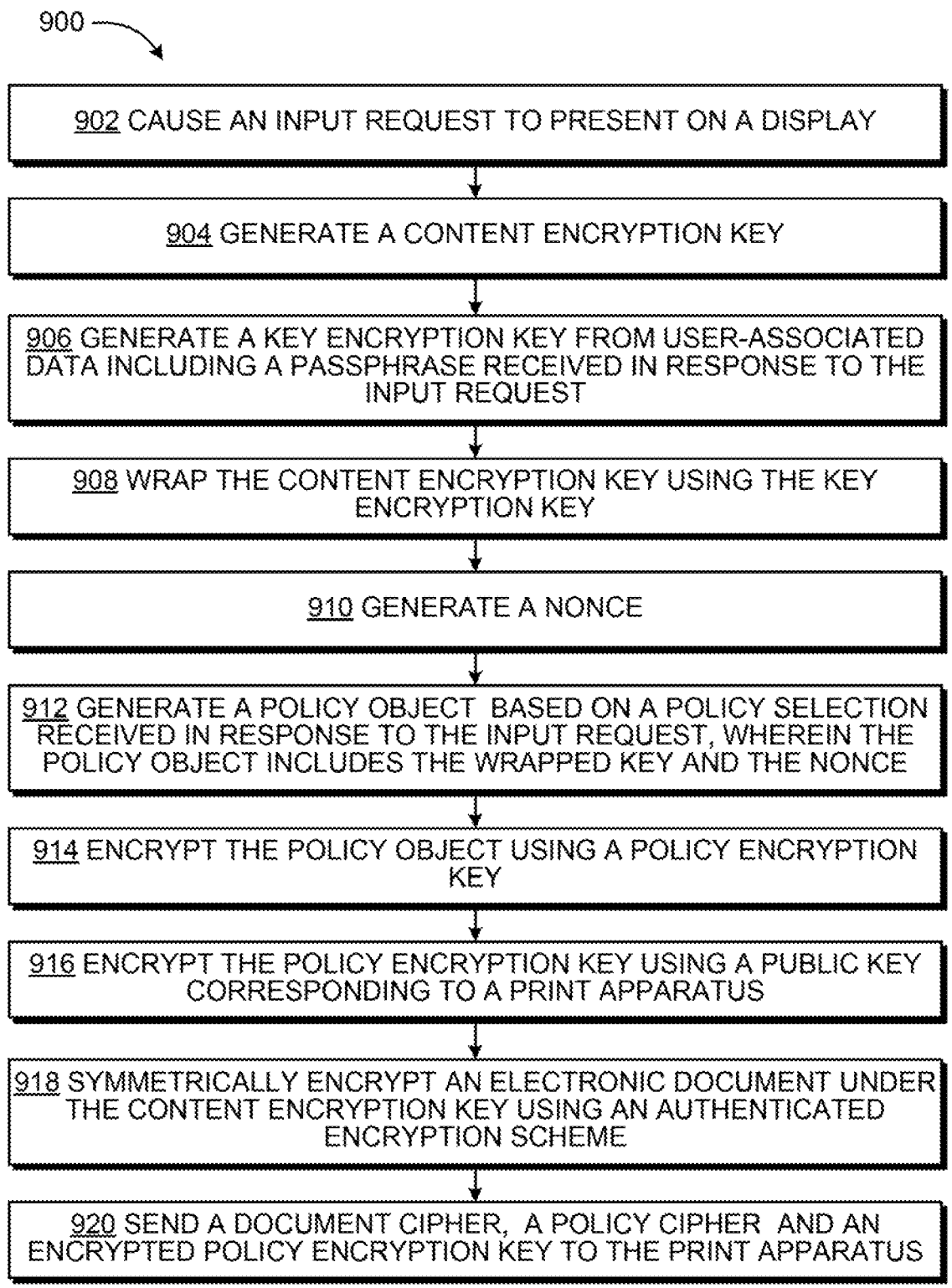

FIG. 9 depicting method 900 includes blocks similar to blocks of FIG. 7 regarding method 700 and provides additional blocks and details, in particular, FIG. 9 depicts additional blocks and details generally regarding controlling a display, generating a nonce, generating a policy object, and sending ciphers to a print apparatus. Blocks 904 and 908 are the same as blocks 702 and 706 of FIG. 7 and, for brevity, their respective descriptions are not repeated.

At block 902, an input request is caused to present on, a display. For example, this may include sending an instruction to a display engine to present information on a display, such as a control panel coupled to a print apparatus. The input request may include a request for input from a user, such as a passphrase to use to secure the print job and/or a selection of a policy rule and/or parameter. At block 906, the KEK is generated from user-associated data including a passphrase received in response to the input request presented at block 902.

At block 908, the CEK is wrapped using the KEK generated from the received passphrase. At block 910, a random nonce is generated. At block 912, a policy object is generated based on a policy selection received in response to the input request at block 902. The policy object generated at block 910 is formed to include a wrapped key and the nonce. The policy object may include other information and/or parameters corresponding to a print job and/or a desired release policy. For example, the policy object may include a policy identifier and/or a policy rule, a print parameter, an initialization vector corresponding to a key (such as the CEK), and document information (such as a title, subject, or a creation date). The policy object is encrypted using a PEK at block 914. At block 916, the PEK is encrypted using a public key corresponding to a print apparatus. The policy object may be encrypted using hybrid encryption where the header of the policy object is decryptable using the PEK.

At block 918, print job data (e.g., an electronic document as plaintext) is symmetrically encrypted under the CEK generated at block 904 using an authenticated encryption scheme. At block 920, ciphers are sent to a print apparatus. Such ciphers sent to the print apparatus at block 920 may include a document cipher (i.e., a cipher corresponding to the print job data encrypted at block 918), a policy cipher (i.e., a cipher corresponding to the policy object encrypted at block 914), and a key cipher (i.e., a cipher corresponding to the PEK encrypted at block 916). The encrypted plaintext document may be sent to the print apparatus along with the encrypted, wrapped CEK. In this manner, the print apparatus may securely receive the information to coordinate printing an electronic document according to a release policy by protecting the key for decrypting the electronic document and policy object are protected by a key encrypted by the public key of the print apparatus. In this manner, the encryption may, for example, prevent man-in-the-middle attacks on the print workflow by binding a document to a specified printer's public key via signed certificates, ensure the chosen printer can learn information about the print job (even if an adversary has knowledge of the user's password), enable detection of alterations to the encrypted job, and allow for printer enforcement of release policies beyond password-based user authentication.

Figure 10:
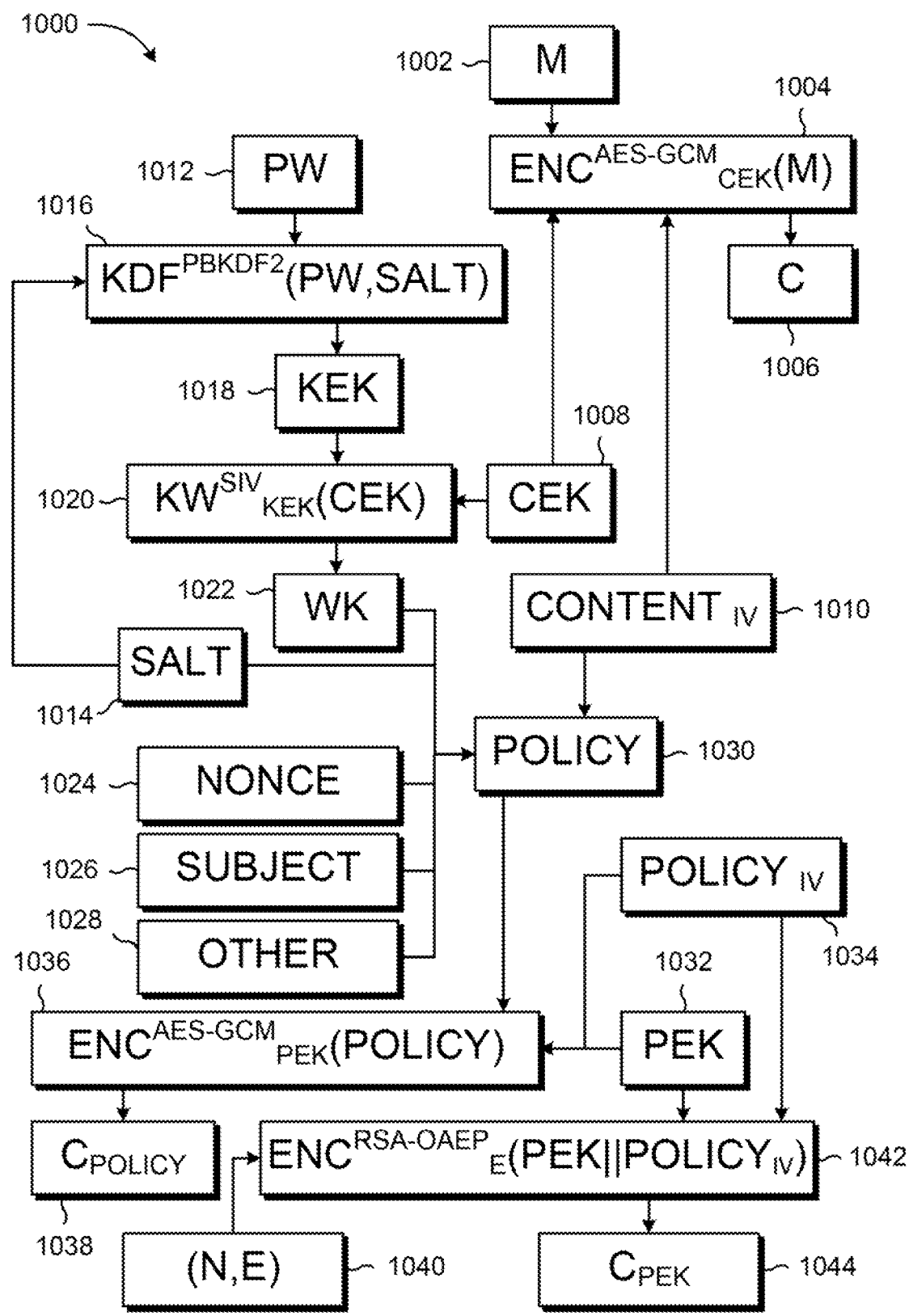

An example encryption workflow 1000 is depicted in FIG. 10. Referring to FIG. 10, the work flow begins with the plaintext print job 1002 (represented as "M" in FIG. 10) and the Rivest-Shamir-Adleman (RSA) public key 1040 of the target printer (represented as "(NE)" in FIG. 10) being taken as input. An authenticated encryption scheme, such as Chacha20-Poly1305, may be used to encrypt the message using a randomly generated CEK and an initialization vector congruent with the chosen authenticated encryption scheme. For example, an Advanced Encryption Standard (AES), such as AES in Galois/Counter Mode (GCM), may be used. A secure pseudo random number generator may be used to randomly generate a CEK 100 and an initialization vector for the content (represented as "$CONTENT_{IV}$" in FIG. 10) is generated according to the security requirements of the authenticated encryption scheme. At block 1004, M is encrypted under CEK with the content initialization vector (CIV) using AES-GCM to generate the ciphertext 1006 (represented as "C" in FIG. 10).

The user inputs a password or PIN number (represented as "PW" in FIG. 10). At block 1016, PW is input to a key derivation function (KDF), such as Password-Based Key Derivation Function 2 (PBKDF2), along with a randomly generated salt, to generate a KEK 1018. At block 1020, the KEK is used to wrap the CEK, via an algorithm that meets the security goals of a key wrap algorithm, such as AES-GCM or misuse resistant mode such as AES in Synthetic Initialization Vector (SIV) mode. The wrapped key 1022 is represented as "WK" in FIG. 10.

A random, 64-bit nonce 1024 is generated. A subject 1026 for the print job and other policy requirements 1028 are input by the user as desired. A policy object 1030 is created using the above data. The policy, object of FIG. 10 includes the WK, the nonce, the CIV used during the encryption of M, the salt used as input to the PBKDF2, the subject, and the other policy requirements.

A PEK 1032 and a corresponding initialization vector 1034 for the policy object (represented as "POLICY$_{IV}$" in FIG. 10) are generated. At block 1036, the policy object is encrypted under PEK using AES-GCM with the policy initialization vector (PIV). The resulting ciphertext 1038 is represented as "C$_{POLICY}$" in FIG. 10.

Known encryption techniques may be used where appropriate with the encryption methods discussed herein. For example, a padding scheme, such as optimal asymmetric encryption padding (OAEP), may be used to process input prior to encryption. At block 1042, the Ply, and the PEK are encrypted using RSA-OAEP under the printers public key (N,E), where N is the printer's RSA modulus and E is the encryption exponent. The resulting ciphertext 1044 is represented as represented as "C$_{PEK}$" in FIG. 10. The ciphertexts C, C$_{PEK}$, and C$_{POLICY}$ are ready to be sent to the printer along with a header that includes the username of the user.

Figure 11:
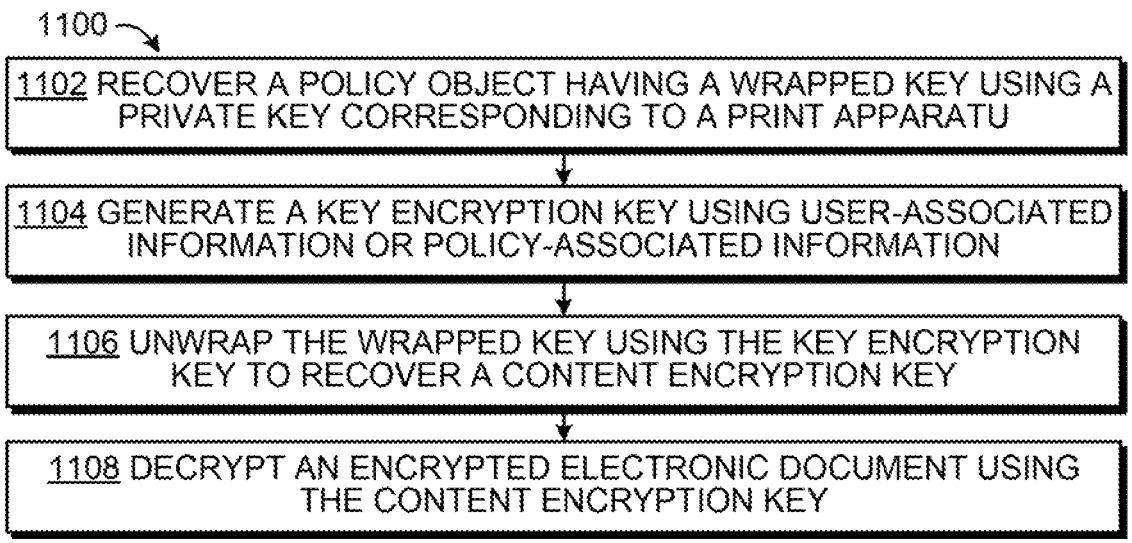
FIGS. 11-15 are, flow diagrams depicting example methods of decryption.

FIGS. 11-15 are flow diagrams depicting example methods of decryption. The methods 1100, 1200, 1300, 1400, and 1500 of FIGS. 11-15 are performable by engines, such as a decryption engine 212 of FIG. 2. Referring to FIG. 11, example method 1100 of decryption may generally comprise recovering a wrapped key, unwrapping the wrapped key using a KEK corresponding to user or policy information, and decrypt an electronic document using the unwrapped key.

At block 1102, a policy object having a wrapped key is recovered using a private key corresponding to a print apparatus. At block 1104, a KEK is generated using user-associated information or policy-associated information. At block 1106, the wrapped key is unwrapped using the KEK generated at block 1104 to recover a CEK. At block 1108, an encrypted electronic document is decrypted using the CEK recovered at block 1106.

Figure 12:
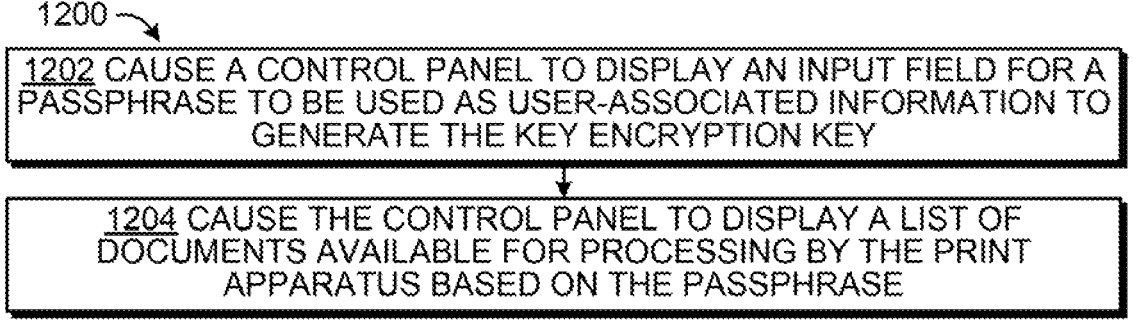

Referring to FIG. 12, a method 1200 of decryption may include causing operation of components of a print apparatus. At block 1202, a control panel is caused to display an input field for a passphrase to be used as user-associated information to generate a KEK (such as at block 1104 of FIG. 11). At block 1204, a control panel is caused to display a list of documents available for processing by a print apparatus based on the passphrase. For example, upon entering a passphrase corresponding to a number of documents, the number of documents may be provided in a list to select for printing at the print apparatus.

Figure 13:
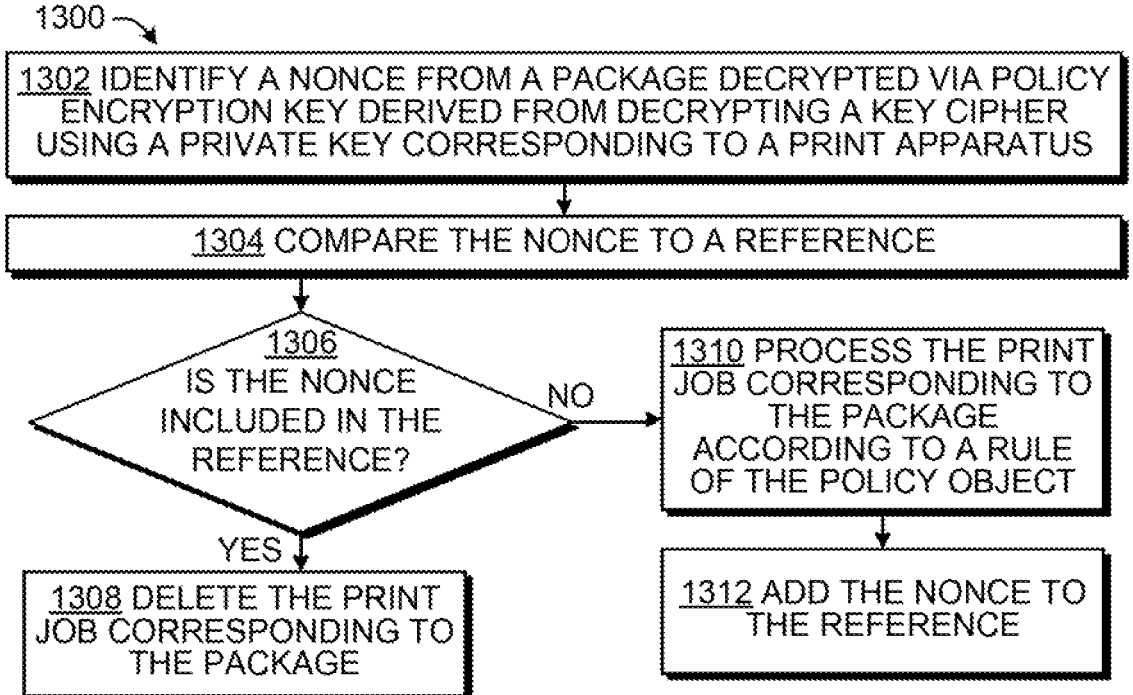

FIG. 13 depicts a method 1300 of decryption using nonce checking. At block 1302, a nonce is identified from a package decrypted via PEK. For example, the PEK may be recovered from a decrypting key cipher using a private key corresponding to a print apparatus and the PEK may be used to decrypt a policy object that includes a wrapped key and nonce. At block 1304, the nonce identified at block 1302 is compared to a reference. The reference may be a list of nonces received previously at the print apparatus or a reference nonce (or lists of nonces) provided by a print server.

Whether the nonce is included in the reference is determined at block 1304 and the determination at block 1304 governs whether to proceed with the print job or not at block 1306. When the nonce of the decrypted policy object is included in the reference, then the print job corresponding to the policy object with the repeated nonce is deleted at block 1308. When the decrypted policy object is not included in the reference, the print job corresponding to the package is processed at block 1310 according to a rule of the policy object. At block 1312, the nonce is added to the reference. In this manner, a print job may be prevented from being replayed by an adversary.

Figure 14:
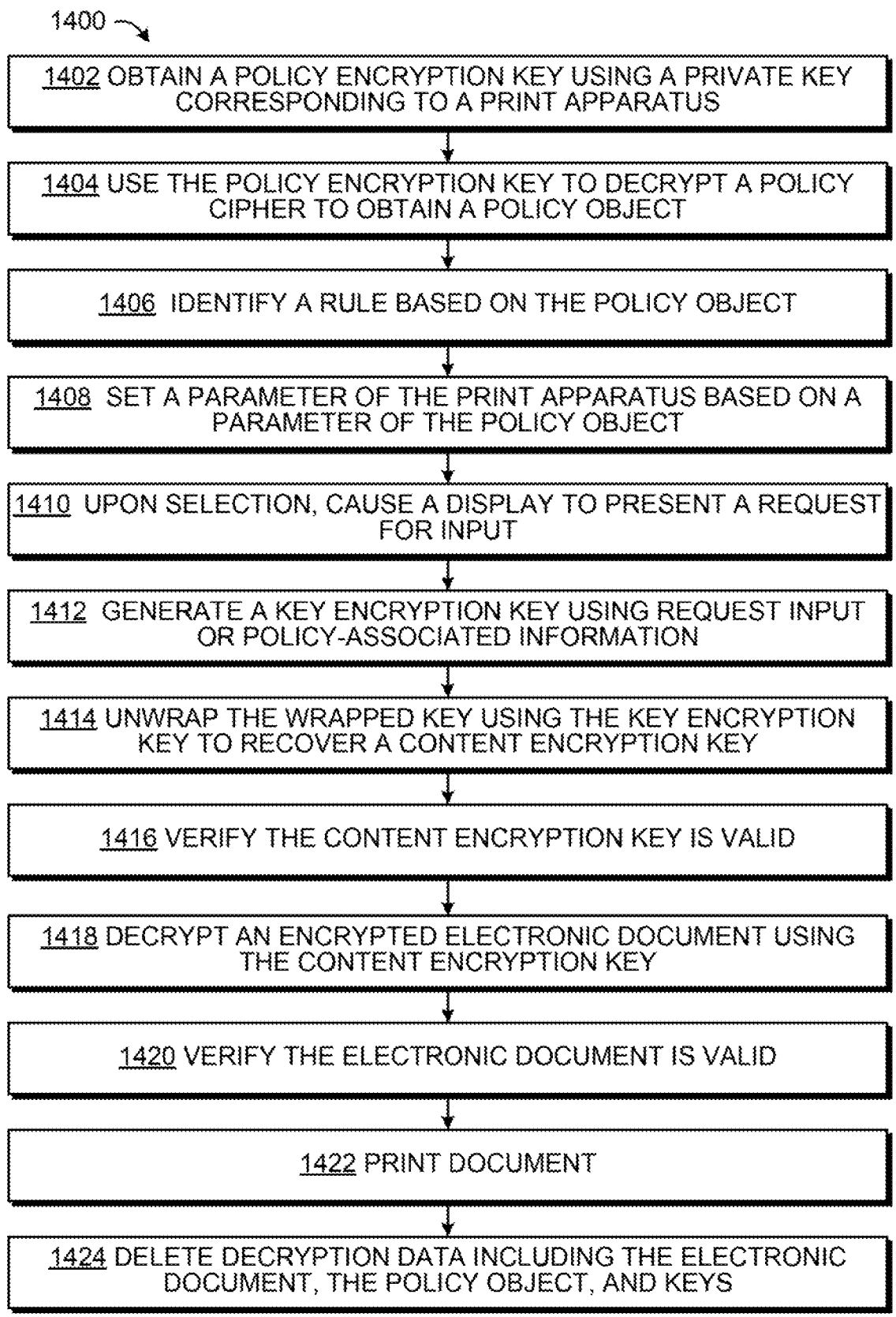

Referring to FIG. 14, a method 1400 of decryption may generally comprise obtaining a PEK using a private key, identifying a release policy, generating a KEK, recovering a CEK using the KEK, verifying keys and print job are authentic, printing a decrypted document, and deleting a decrypted data from a print device.

At block 1402, a PEK is obtained using a private key corresponding to a print apparatus. At block 1404, the PEK obtained at block 1402 is used to decrypt a policy cipher to obtain a policy object.

At block 1406, a rule is identified based on the policy object obtained at block 1404. At block 1408, a parameter of the print apparatus (such as a printer setting) is set based on a parameter of the policy object obtained at block 1404. At block 1410, a display is caused to present a request for input upon selection of a print job corresponding to the policy object obtained at block 1404.

At block 1412, a KEK is generated using policy-associated information and/or user input received from the request displayed at block 1410. At block 1414, the wrapped key of the policy object is unwrapped using the KEK generated at block 1412 to recover a CEK. At block 1416, the CEK recovered at block 1414 is verified as valid.

At block 1418, an encrypted electronic document is decrypted using the CEK recovered at block 1414. The result (e.g., the plain text content) from decrypting the encrypted electronic document is verified as valid or not at block 1420. The verified document is printed by the print apparatus at block 1422. For example, the print apparatus may perform a print operation of the decrypted electronic document according to a release policy, where the print apparatus operates according to a release policy by setting a parameter of the printer according to a parameter of the policy object and operating a workflow of the printer based on a rule of the policy object. The decryption data is deleted from the print apparatus (e.g., to prevent retrieval from an attacker) at block 1424. The decryption data may include the electronic document, the policy object, and any recovered keys. The deletion at block 1424 may occur after printing is complete or in response to identification that a key, policy, nonce, or document is invalid.

Figure 15:
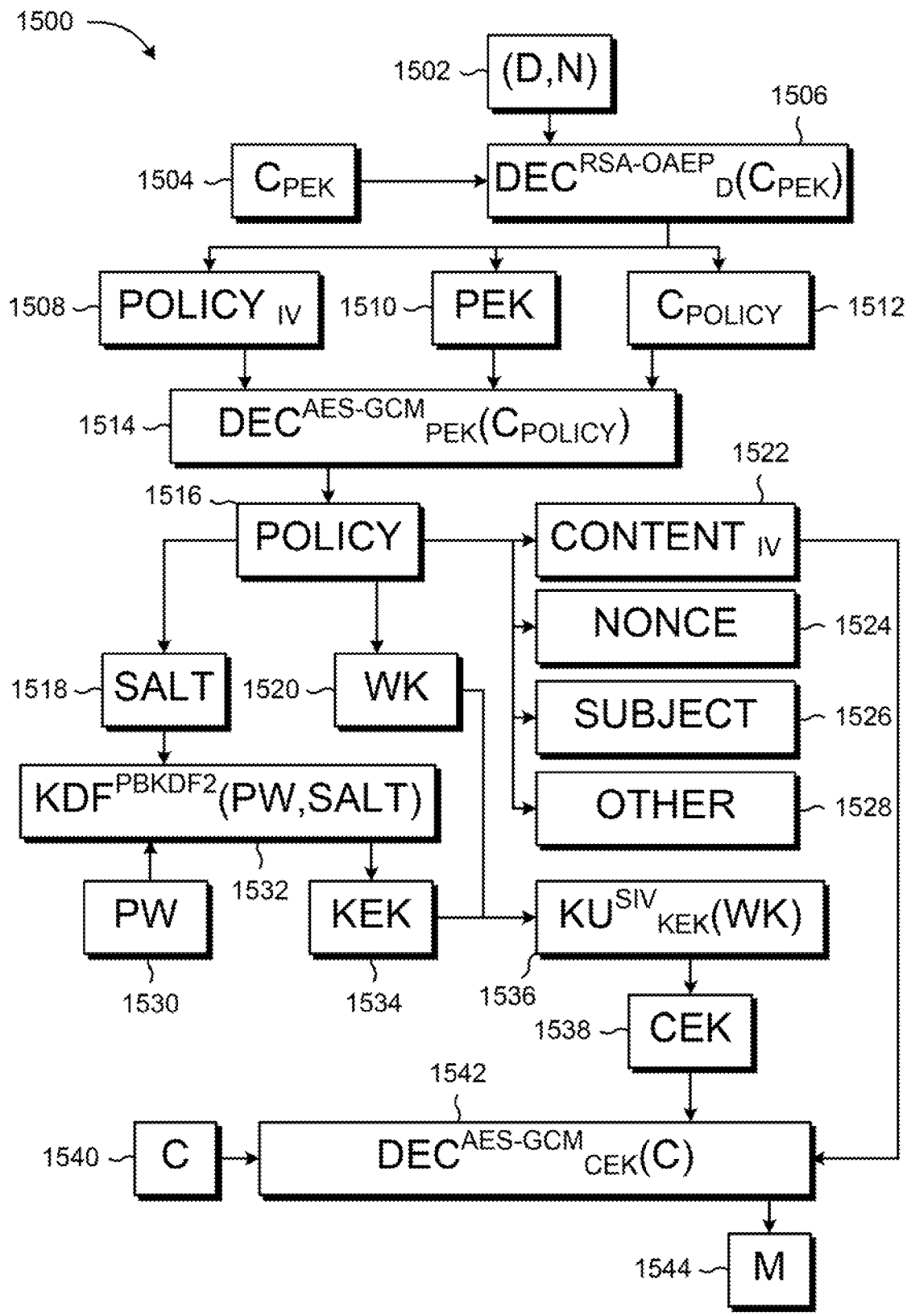

An example decryption workflow 1500 is depicted in FIG. 15. Acronyms used with FIG. 15 were previously defined with the description of FIG. 10. Referring to FIG. 15, the printer receives a tuple of ciphertexts including C 1504, C$_{PEK}$ 1540, and C$_{POLICY}$ 1512. Using the RSA secret key 1502 (represented as "D" in FIG. 15), the printer decrypts C$_{PEK}$ to recover PEK 1510 and PIV 1508 at block 1506.

At block 1514, C$_{POLICY}$ is decrypted using the recovered PEK to recover the policy object including the wrapped key 1520, salt 1518, CIV 1522, nonce 1524, subject 1526, and other policy requirements 1528. From the information included in the policy object 1516, the print apparatus verifies whether the nonce 1524 is fresh against a list of previously received nonces. If the nonce 1524 has been presented before, the print job is discarded (i.e., the printer discards C, $C_{PEK}$, and $C_{POLICY}$). If the nonce 1524 has not been presented before, the nonce 1524 is added to the list of previously presented nonces and the workflow continues.

The print apparatus may display text 1526 corresponding to the subject line of the policy object to the user. The user recognizes the subject and inputs their password/PIN 1530, represented as "PW" in FIG. 15. At block 1532, the user's password/PIN is used as input to the KDF along with the salt 1518 recovered from the policy object to calculate KEK 1534. At block 1536, the wrapped key 1520 is unwrapped via the SIV using KEK 1534 to recover (and verify the) CEK 1538.

At block 1542, ciphertext 1540 is decrypted under the CEK 1538 (using the CIV recovered in the policy object) to recover (and verify) plaintext document 1544. The plaintext document 1544 is ready to be printed by the print apparatus in accordance with the release policy and all relevant data (e.g., M, PEK, CEK, KEK, WK, C, $C_{PEK}$, and $C_{POLICY}$) is deleted. In this manner, the plaintext document 1544 may be securely decrypted and prevented from attacks focused on the printer or the user password, for example.

By using the encryption methods and decryption methods discussed herein, man-in-the-middle attacks on the print workflow may be prevented by binding a document to a specified printer's public key via signed certificates, the destination printer may learn information about the print job (even if an adversary has knowledge of the user's password), alterations to the encrypted job may be detectable, and release policies beyond password-based user authentication may be enforced, as examples.

Although the flow diagrams of FIGS. 7-15 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus. Furthermore, the use of the words "first," "second," or related terms in the claims are not used to limit the claim elements to an order or location and are merely used to distinguish separate claim elements.

The present description has been shown and described with reference to the foregoing examples. It is understood, however, that other forms, details, and examples may be made without departing from the spirit and scope of the following claims.

What is claimed is:

1. A method of encryption comprising:
    generating a content encryption key to use for content of an electronic document;
    generating a key encryption key from user-associated data;
    wrapping the content encryption key based on a key wrap operation using the key encryption, key;
    encrypting the wrapped content encryption key using a policy encryption key; and
    encrypting the policy encryption key using a public key corresponding to a print apparatus.

2. The method of claim 1, comprising:
    causing an input request to present on a display;
    using a passphrase received in response to the input request to generate the key encryption key;
    generating a policy object based on a policy selection received in response to the input request, the policy object to include the wrapped key and information corresponding to a print job to print the electronic document; and
    encrypting the policy object using the policy encryption key.

3. The method of claim 1, comprising:
    generating a nonce;
    generating a policy object including the nonce, the wrapped content encryption key, an initialization vector corresponding to the content encryption key, a policy rule, and information corresponding to the electronic document;
    encrypting the policy object using the policy encryption key; sending a policy cipher derived from encrypting the policy object to the print apparatus; and
    sending the encrypted policy encryption key to the print apparatus.

4. The method of claim 1, comprising:
    encrypting a number of packages corresponding to a number of printers in a printer group when the printer group includes more than one printer, wherein:
    the print group includes the print apparatus; and
    each package includes a policy object encrypted using the policy encryption key, and the policy encryption key encrypted with a public key corresponding to a target printer of the printer group.

5. The method of claim 1, comprising:
    unwrapping a package encrypted by a public key corresponding to a service address;
    identifying a printer of printer group corresponding to a service at the service address; and
    rewrapping the package using a public key corresponding to the printer.

6. The method of claim 1, comprising:
    symmetrically encrypting a plaintext document under the content encryption key using an authenticated encryption scheme; and
    sending the encrypted, wrapped content encryption key along with the encrypted plaintext document to the print apparatus;
    wherein the policy object is encrypted using hybrid encryption, and the header of the policy object is decryptable using the policy encryption key.

7. A method of decryption comprising:
    recovering a policy object using a private key corresponding to a print apparatus, the policy object including a wrapped key;
    generating a key encryption key using user-associated information;
    unwrapping the wrapped key using the key encryption key to recover a content encryption key; and
    decrypting an encrypted electronic document using the content encryption key.

8. The method of claim 7, comprising:
identifying a rule based on the policy object decrypted using the private key;
setting a parameter of the print apparatus based on a parameter of the policy object;
performing a print operation of the decrypted electronic document using the print apparatus set to the parameter according to the rule of the policy object; and
deleting decryption data, the decryption data including the electronic document and the policy object;
wherein recovering the policy object comprises:
obtaining a policy encryption key using the private key; and
using the policy encryption key to decrypt a policy cipher to obtain the policy object.

9. The method of claim 7, comprising:
identifying a nonce from a package decrypted via a policy encryption key derived from decrypting a key cipher using the private key;
comparing the nonce to a reference; and
when the nonce is included in the reference:
deleting a print job corresponding to the package; or
when the nonce is not included in the reference:
adding the nonce to the reference; and
processing the print job corresponding to the package according to a rule of the policy object.

10. The method of claim 7, comprising:
causing a control panel to display an input field for a passphrase, the passphrase to be used as user-associated information to generate the key encryption key; and
causing the control panel to display a list of documents available for processing by the print apparatus.

11. A non-transitory computer-readable storage medium comprising a set of instructions executable by a processor resource to:
generate a key encryption key from policy-associated data;
encrypt a content encryption key using the key encryption key to generate a wrapped key;
generate a policy object, the policy object including the wrapped key;
encrypt the policy object with a policy encryption key; and
encrypt the policy encryption key using a public key of a print apparatus.

12. The medium of claim 11, wherein the set of instructions is executable by the processor resource to:
encrypt content using the content encryption key;
randomly generate a nonce;
package the wrapped key, print job information, and the nonce into a policy object; encrypt the policy object using the policy encryption key; and
send a first cipher corresponding to the encrypted policy object and a second cipher corresponding to the encrypted policy encryption key to the print apparatus.

13. A medium of claim 11, wherein the set of instructions is executable by the processor resource to:
receive an electronic file encrypted with a public key of a print server;
unwrap the electronic file to recover the policy object; and
select the print apparatus from a printer group identified by the print server based on a retrieval request.

14. A print apparatus comprising:
a display engine including circuitry and processor executable instructions to cause a control panel to display a user information request;
a decryption engine including circuitry and processor executable instructions to:
decrypt a key cipher using a private key corresponding to the print apparatus to recover a policy encryption key;
decrypt a policy cipher using the policy encryption key to recover a policy object, the policy object including a wrapped key;
unwrap the wrapped key using a key encryption key generated from user provided information to recover a content encryption key; and
decrypt an encrypted electronic document using the content encryption key; and
a print engine including circuitry and processor executable instructions to:
operate the print apparatus according to a rule of the policy object; and
print the decrypted electronic document when the rule of the policy object is satisfied.

15. The print apparatus of claim 14, wherein the decryption engine is to:
cause the display engine to display a list of available print jobs for the print apparatus;
retrieve a number of nonces from a storage medium coupled to the print apparatus; compare a nonce of a print job corresponding to the policy object to the number of nonces retrieved from the storage medium;
delete the print job in response to identification of a replayed nonce corresponding to the print job;
cause the display engine to display a prompt for a password corresponding to the key encryption key in response to a job selection of the list of available print jobs; and
cause the display engine to display an error message in response to a request to print the print job outside of the rule or a parameter corresponding to the policy object.

* * * * *